Patented Dec. 3, 1946

2,411,899

UNITED STATES PATENT OFFICE 2,411,899

TREATMENT OF ACRYLIC ESTER POLYMERS

Stephen T. Semegen, Akron, Ohio, assignor to The B. F. Goodrich Company, New York, N. Y., a corporation of New York No Drawing. Application May 9, 1945, Serial No. 592,923

20 Claims. (Cl. 260—83)

This invention relates to a method for curing acrylic ester polymers and pertains more specifically to a method for transforming such polymers from soft, plastic materials to tough, resilient products similar to vulcanized rubber.

I have found that such transformation may be accomplished by dispersing in the polymer a small amount of an alkali metal salt of silica and heating the resulting composition. Among the silicates which may be employed are crystalline hydrated sodium metasilicate, sodium disilicate, water glass, potassium metasilicate, potassium disilicate, lithium metasilicate, and the like. The hydrated alkali metal silicates are particularly useful. The amount of silicate employed is not critical, but may vary over a wide range from about 2 to about 25% by weight of the polymer, although it is generally preferred to use from about 5 to about 20% by weight. The silicate may be dispersed in the polymer composition by any of the usual methods; for example, by mixing it with the solid plastic polymer on a roll mill, or by adding the silicate in finely divided form to a solution of the polymer in a suitable organic solvent. The silicate may also be mixed with the polymer by adding it either as a solid or in the form of an aqueous solution or dispersion to an aqueous dispersion of the acrylic ester polymer.

The polymers to which my new process may be applied include any plastic or fusible polymers made by the polymerization of an ester of acrylic acid. Although some esters of acrylic acid, for example, allyl acrylate or ethylene glycol diacrylate, may be polymerized to give a hard, brittle material having a very high melting point, it is also possible to obtain plastic or fusible polymers from such esters; these plastic polymers may be treated by the process of my invention in order to toughen them. The process of this invention is of greatest importance, however, when applied to plastic polymers made by the polymerization of esters of acrylic acid with saturated aliphatic monohydric alcohols. Among such polymers are those made by the polymerization of 2-chlorethyl acrylate, beta-diethylaminoethyl acrylate, 2-methoxyethyl acrylate, 2-ethoxyethyl acrylate, 2-butoxyethyl acrylate, and the like. Particularly important are polymers made by the polymerization of alkyl esters of acrylic acid, such as methyl acrylate, ethyl acrylate, n-propyl acrylate, isobutyl acrylate, n-amyl acrylate, lauryl acrylate, and the like. All of the foregoing esters of acrylic acid may be polymerized by the methods commonly employed for polymerization of methyl acrylate. The esters themselves may be prepared in a conventional manner by reacting the appropriate alcohol with acrylic acid or acrylic acid chloride under esterification conditions, or by other known methods. The polymer need not be made solely from an ester of acrylic acid, but may be a plastic polymer made by the polymerization of a substantial proportion of an ester of acrylic acid with another material copolymerizable therewith, such as, for example, vinyl halide, vinyl esters, vinylidene halide, and other ethylenic compounds.

As an example of the process of this invention, a plastic polymer of methyl acrylate was mixed on a roll mill with 10% by weight of crystalline hydrated sodium metasilicate; the mixture was heated in a mold about 60 minutes at a temperature of 275 to 320° F. The product no longer possessed the plastic properties of the original polymer, but on the contrary, resembled a strong, well-vulcanized soft rubber. Similar results may be obtained with other polymeric acrylic esters.

Any of the usual pigments and fillers commonly used in the rubber and plastics industries may be added to the composition without any deleterious effect upon the vulcanization process. Softeners, plasticizers, and other ingredients may also be employed if so desired.

The time and temperature at which the composition need be heated in order to bring about the desired change in properties varies with the particular polymer employed, as well as with the kind and amount of silicate in the composition. Although the process may be carried out by heating the composition for a very long time at temperatures below 200° F., for practical purposes it is generally necessary to employ a temperature between about 200° F. and 400° F., preferably between 250 and about 325° F. At these temperatures the time required to obtain the desired results varies between about 15 minutes and two hours, depending upon the particular temperature and polymer employed.

The product adheres strongly to many materials such as wood and textile fabrics, and can therefore be used in the manufacture of composite products, such as are made from rubber, and in cases in which it does not adhere directly, it can be secured to other materials by means of adhesive cement, such as solutions of chlorinated rubber. The product is accordingly useful in the manufacture of such typical articles as impregnated and coated fabrics, molded goods in great variety, belting, hose, pneumatic tires, flooring, and many others.

This application is a continuation-in-part of my copending application, Serial No. 453,027, filed July 31, 1942.

Although I have herein disclosed specific embodiments of my invention, I do not intend to limit myself solely thereto, but to include all of the obvious variations and modifications falling within the spirit and scope of the appended claims.

I claim:

1. The process of curing a plastic polymer of an ester of acrylic acid, which comprises heating said polymer with from about 2 to about 25% by weight of an alkali metal salt of silica dispersed therein.

2. The process of curing a plastic polymer of a saturated aliphatic monohydric alcohol ester of acrylic acid, which comprises heating said polymer with from about 2 to about 25% by weight of an alkali metal salt of silica dispersed therein.

3. The process of curing a plastic polymer of a saturated aliphatic monohydric alcohol ester of acrylic acid, which comprises heating said polymer with from about 2 to about 25% by weight of sodium silicate dispersed therein.

4. The process of curing a plastic polymer of an alkyl ester of acrylic acid, which comprises heating said polymer with from about 2 to about 25% by weight of an alkali metal salt of silica dispersed therein.

5. The process of curing a plastic polymer of an alkyl ester of acrylic acid, which comprises heating said polymer with from about 2 to about 25% by weight of sodium silicate dispersed therein.

6. The process of curing a plastic polymer of ethyl acrylate which comprises heating said polymer with from about 2 to about 25% by weight of an alkali metal salt of silica dispersed therein.

7. The process of curing a plastic polymer of ethyl acrylate, which comprises heating said polymer with from about 2 to about 25% by weight of sodium silicate dispersed therein.

8. The process of curing a plastic polymer of a saturated aliphatic monohydric alcohol ester of acrylic acid, which comprises heating said polymer at about 250° to 325° F. with from about 2 to about 25% by weight of a hydrated alkali metal salt of silica dispersed therein.

9. The process of curing a plastic polymer of an alkyl ester of acrylic acid, which comprises heating said polymer at about 250° to about 325° F., with from about 2 to about 25% by weight of a hydrated alkali metal salt of silica dispersed therein.

10. The process of curing a plastic polymer of an alkyl ester of acrylic acid, which comprises heating said polymer at about 250° to about 325° F. with from about 2 to about 25% by weight of hydrated sodium silicate dispersed therein.

11. A cured polymer composition made by heating a plastic polymer of an ester of acrylic acid with from about 2 to about 25% by weight of an alkali metal salt of silica dispersed therein.

12. A cured polymer composition made by heating a plastic polymer of a saturated aliphatic monohydric alcohol ester of acrylic acid with from about 2 to about 25% by weight of an alkali metal salt of silica dispersed therein.

13. A cured polymer composition made by heating a plastic polymer of a saturated aliphatic monohydric alcohol ester of acrylic acid with from about 2 to about 25% by weight of sodium silicate dispersed therein.

14. A cured polymer composition made by heating a plastic polymer of an alkyl ester of acrylic acid with from about 2 to about 25% by weight of an alkali metal salt of silica dispersed therein.

15. A cured polymer composition made by heating a plastic polymer of an alkyl ester of acrylic acid with from about 2 to about 25% by weight of sodium silicate dispersed therein.

16. A cured polymer composition made by heating a plastic polymer of ethyl acrylate with from about 2 to about 25% by weight of an alkali metal salt of silica dispersed therein.

17. A cured polymer composition made by heating a plastic polymer of ethyl acrylate with from about 2 to about 25% by weight of sodium silicate dispersed therein.

18. A cured polymer composition made by heating a plastic polymer of a saturated aliphatic monohydric alcohol ester of acrylic acid at about 250° to about 325° F. with from about 2 to about 25% by weight of a hydrated alkali metal salt of silica dispersed therein.

19. A cured polymer composition made by heating a plastic polymer of an alkyl ester of acrylic acid at about 250° to about 325° F. with from about 2 to about 25% by weight of a hydrated alkali metal salt of silica dispersed therein.

20. A cured polymer composition made by heating a plastic polymer of an alkyl ester of acrylic acid at about 250° to about 325° F. with from about 2 to about 25% by weight of hydrated sodium silicate dispersed therein.

STEPHEN T. SEMEGEN.